United States Patent [19]
Koga

[11] Patent Number: 5,167,065
[45] Date of Patent: Dec. 1, 1992

[54] WHEEL ATTACHMENT AID APPARATUS IN AUTOMOBILE ASSEMBLY LINE

[75] Inventor: Michitaka Koga, Saitama, Japan

[73] Assignee: Fuji Jukogyo Kabushiki Kaisha, Tokyo, Japan

[21] Appl. No.: 739,285

[22] Filed: Aug. 2, 1991

[30] Foreign Application Priority Data

Aug. 13, 1990 [JP] Japan ................. 2-84528[U]

[51] Int. Cl.⁵ ............................................ B23P 19/04
[52] U.S. Cl. ....................................... 29/824; 29/787; 29/802
[58] Field of Search ................. 29/273, 429, 430, 786, 29/787, 793, 795, 822, 823, 824, 894.31, 802; 414/225, 226, 426, 427, 428, 713; 901/7

[56] References Cited

U.S. PATENT DOCUMENTS

| | | | |
|---|---|---|---|
| 4,033,033 | 7/1977 | Heffner | 29/824 |
| 4,042,139 | 8/1977 | Pernsteiner et al. | 29/273 X |
| 4,257,158 | 3/1981 | Casutt et al. | 29/824 |
| 4,286,369 | 9/1981 | Fusco | 29/273 |
| 4,779,336 | 10/1988 | Inoue et al. | 29/822 X |
| 4,841,632 | 6/1989 | Namiki et al. | 29/823 X |
| 5,088,176 | 2/1992 | Koga | 29/824 X |

FOREIGN PATENT DOCUMENTS 61-24679  2/1986  Japan .
187674    8/1987  Japan ..................... 29/823

Primary Examiner—Joseph M. Gorski
Assistant Examiner—Peter Dungba Vo
Attorney, Agent, or Firm—Beveridge, DeGrandi & Weilacher

[57] ABSTRACT

In an automobile assembly line wherein a car body is hung and conveyed by a hanger; an apparatus for aid in attaching a wheel in which the wheel is set on a pair of wheel supporting structures (12, 12) at a wheel placement position, a base plate (10) is held in a balanced state by an air cylinder (16) interposed between a pole (8) and a vertical motion unit (9), the base plate (10) supporting the wheel is approximated to a wheel attachment position in the car body (1) while being synchronously moved by a synchronous motion unit (5), and the wheel is moved horizontally and vertically by turning an annular handle (15) with its balanced state kept by the air cylinder (16), thereby to effect the positioning between the wheel and a hub on the car body (1), so that an operator need not directly lift up the wheel.

5 Claims, 2 Drawing Sheets

WHEEL ATTACHMENT AID APPARATUS IN AUTOMOBILE ASSEMBLY LINE

BACKGROUND OF THE INVENTION

The present invention relates to a wheel attachment aid apparatus in an automobile assembly line, which is installed by the side of the automobile assembly line and which can relieve a mounting operation in the case of attaching a wheel to a car body.

The operation of attaching a wheel to a car body conveyed along an automobile assembly line is such that an operator takes the supplied wheel out of a tyre lifter and sets it on the car body, and that he/she locks the wheel tentatively with nuts and thereafter tightens the nuts by the use of a nut runner. Therefore, it has such drawbacks that a heavy burden is imposed on the operator and that the degradation of a job efficiency is incurred.

As a countermeasure, there has been proposed a wheel attachment apparatus in an assembly line wherein, as disclosed in the official gazette of Japanese Patent Application Laid-open No. 24679/1986, a bearing member is disposed so as to reciprocate in a direction orthogonal to the moving direction of a vehicle while being guided by a guide member which is suspended below a traveling truck adapted to travel along the assembly line, through a pole capable of extending/shortening and swiveling, a supporting member is disposed which is held turnable in the circumferential direction of a wheel by a holding member rockably journaled in the bearing member and on which a plurality of nut runners are set, and a clamp device is disposed for fixing the wheel to the supporting member, thereby to facilitate the operation of attaching the wheel.

With the wheel attachment apparatus in the prior art, the nut runners may be actuated after previously fixing and positioning the wheel with the clamp device so as to hold the mounting holes of the wheel and the sockets of the nut runners in opposition and then bringing the mounting holes of the wheel and the hub bolts of a hub into agreement. Accordingly, enhancement in the job efficiency is attained. However, the wheel needs to be fixed to the clamp device beforehand so that the mounting holes of the wheel may oppose to the sockets of the nut runners, and an accessory device such as wheel positioning device therefor is required. Besides, the nut runners are unitarily mounted. Therefore, the whole apparatus becomes large-sized and complicated to occupy a large installation space and to incur a rise in the cost of equipment. Another drawback is that the apparatus is difficult of installation in an existing assembly line.

SUMMARY OF THE INVENTION

It is accordingly an object of the present invention to provide a wheel attachment aid apparatus in an automobile assembly line, which dispenses with the wheel positioning device as mentioned above and has no nut runner mounted therein, thereby to reduce the size and simplify the construction of the whole apparatus, to sharply curtail the cost of equipment and to realize an easy installation even in an existing assembly line, and which can relieve a burden on an operator.

A wheel attachment aid apparatus in an automobile assembly line according to the present invention comprises a hanger by which a car body is hung and conveyed along said assembly line, a truck which is disposed so as to be movable along said assembly line sideward of said assembly line, a synchronous motion unit which is mounted on said truck and which moves said truck in engagement with said hanger and in synchronism with the conveyed automobile, a bed which is mounted on a lower surface of said truck so as to be horizontally movable in a direction intersecting said assembly line, a pole which is suspended from said bed, a vertical motion unit which is mounted so as to be vertically movable along said pole, a flat base plate which is suspended by said vertical motion unit and which has an opening in its central part, an annular sprocket which is supported on said base plate so as to be turnable along an outer periphery of said opening, a pair of wheel supporting structures which are respectively disposed at front and rear ends of said base plate on a lower side thereof so as to project toward said assembly line and to be turnable about horizontal rotational axes and each of which has a sprocket mounted thereon, a handle which is mounted on said annular sprocket and which drives and rotates said annular sprocket, a chain which is wound over said annular sprocket and the sprockets of said wheel supporting structures and which drives and rotates said wheel supporting structures through manipulation of said handle, and an air cylinder which is spanningly interposed between said pole and said vertical motion unit and which has a function as a balancing actuator for holding said base plate in a balanced state in correspondence with a weight of a wheel placed on said wheel supporting structures.

With the wheel attachment aid apparatus of the present invention, the wheel is placed and set on the pair of wheel supporting structures at a wheel placement position, and the base plate is held in the balanced state by the air cylinder which is spanningly interposed between the pole and the vertical motion unit. Next, the synchronous motion unit mounted on the truck is brought into engagement with the hanger so as to move the truck in synchronism with the conveyed car body, and the bed is moved toward the assembly line so as to approximate the base plate holding the wheel to the wheel attachment position of the car body. Subsequently, the base plate is moved in horizontal and vertical directions by the handle, and the handle is turned to turn the wheel through the annular sprocket, the chain, and the sprockets of the wheel supporting structures. Hub bolts erected on the hub of the car body are inserted into the mounting holes of the wheel, and the wheel is attached to the car body by nuts. After the attaching operation, the apparatus is restored to its original position and is caused to stand by.

PREFERRED EMBODIMENT OF THE INVENTION

Now, an embodiment of a wheel attachment aid apparatus in an automobile assembly line in the present invention will be described with reference to the drawings.

Figure 1:
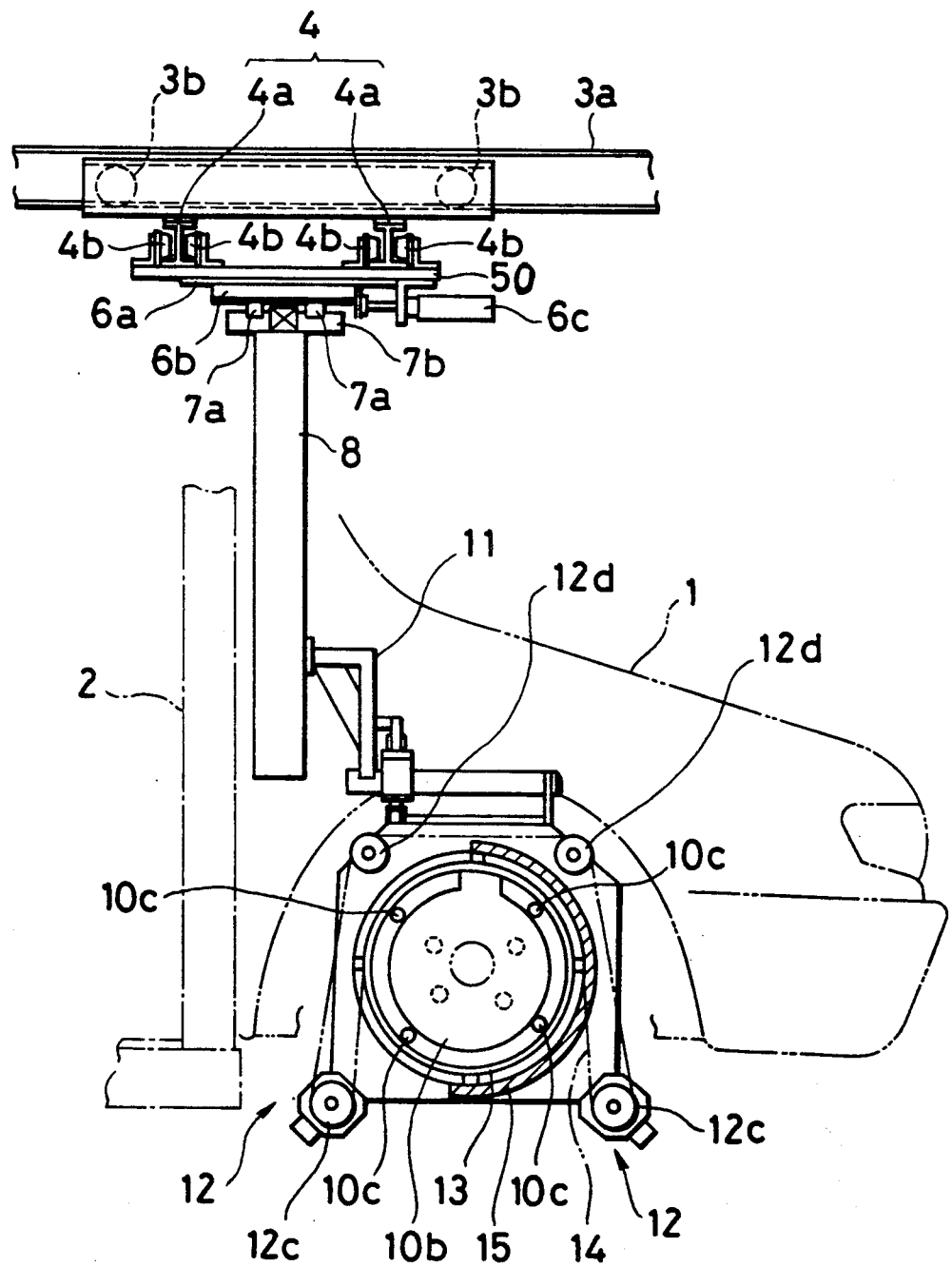
FIG. 1 is a front view showing an embodiment of a wheel attachment aid apparatus in an automobile assembly line according to the present invention.
Figure 2:
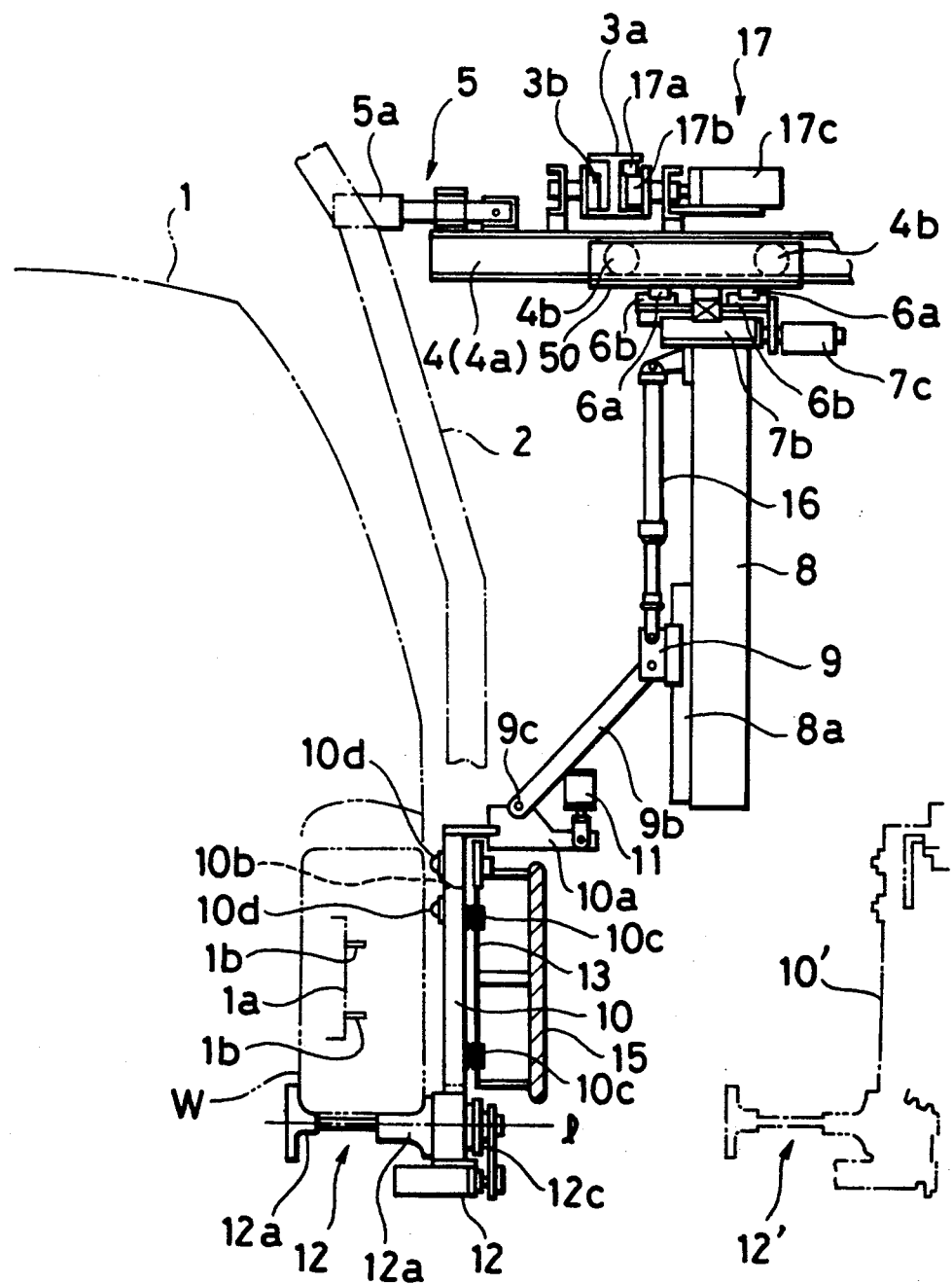
FIG. 2 is a side view of the embodiment.

FIG. 1 is a front view of this embodiment, while FIG. 2 is a side view thereof.

Referring to the figures, numeral 1 designates a car body, which is hung through a hanger 2 by a rail (not shown) laid above and which is conveyed along the assembly line.

A rail 3a extending along the assembly line is disposed by the side of the assembly line in which the car body 1 is conveyed. A truck 4 which includes rails 4a, 4a each extending in a horizontal direction orthogonal to the rail 3a, is suspended from the rail 3a through guide rollers 3b, 3b.

A synchronous motion unit 5 having a protrusive piece 5a which is protracted and retracted by an air cylinder (not shown), is mounted on the truck 4. It is so constructed that, by protracting the protrusive piece 5a to come into abutting engagement with the hanger 2, the truck 4 is moved while being guided by the rail 3a in synchronism with the movement of the conveyed car body 1.

A bed 50 is suspended by the rails 4a, 4a constituting the truck 4, so as to be horizontally movable in the direction orthogonal to the assembly line through rollers 4b, 4b, . . . .

Mounted on the lower surface of the bed 50 are rails 6a, 6a which extend along the assembly line, sliders 6b, 6b which are moved along the rails 6a, 6a, and a cylinder 6c which moves the sliders 6b, 6b along the rails 6a, 6a. Further, on the lower surfaces of the sliders 6b, 6b, there are mounted rails 7a, 7a which extend in a direction intersecting the assembly line, sliders 7b, 7b which are moved along the rails 7a, 7a, and a cylinder 7c which moves the sliders 7b, 7b along the rails 7a, 7a. A pole 8 suspended from the sliders 7b, 7b is adapted to move along the assembly line and orthogonally thereto relative to the bed 50.

A vertical motion unit 9 is disposed so as to be vertically movable along a rail 8a which is vertically extended on the pole 8. An air cylinder 16 to be described later is spanningly interposed between the vertical motion unit 9 and the upper part of the pole 8.

An arm 9b extending downwards aslant is provided at the lower end of the vertical motion unit 9, and a flat base plate 10 is connected to the arm 9b through a bracket 10a which is rockably mounted by a rotating pin 9c. The base plate 10 can have its angle adjusted easily by an angle adjusting device constructed of a cylinder 11 which is spanningly interposed between the bracket 10a and the arm 9b.

A circular opening 10b is formed in the central part of the base plate 10. A pair of wheel supporting structures 12, 12 are disposed at the front and rear ends of the base plate 10 on the lower side thereof so as to project toward the assembly line and to be rotatable about horizontal axes l. Each of the wheel supporting structures 12, 12 is provided with a pair of wheel carriers 12a, 12a which receive a wheel W and the distance of which can be adjusted by the extending or shortening operation of an air cylinder 12b.

Further, an annular sprocket 13 surrounding the peripheral edge of the central opening 10b of the base plate 10 is mounted so as to be rotatable owing to guide rollers 10c, 10c, . . . A chain 14 is wound over sprockets 12c, 12c fixed to the ends of the shafts of the wheel supporting structures 12, 12, sprockets 12d, 12d fixed to the front and rear ends of the base plate 10 on the upper side thereof, and the annular sprocket 13. With such a setup, the wheel supporting structures 12, 12 are rotated by turning an annular handle 15 mounted so as to be superposed on the annular sprocket 13 in a projective figure, and the wheel W received by the wheel carriers 12a, 12a, . . . is rotated in its circumferential direction in accordance with the rotation of the handle 15. Incidentally, symbols 10d denote ball bearings which facilitate the rotation of the wheel W.

The air cylinder 16 which is spanningly interposed between the upper end of the pole 8 and the vertical motion unit 9, functions as a balancing actuator. Accordingly, when the wheel W has been placed on the wheel supporting structures 12, 12 by an operator, the air cylinder 16 is adjusted to extend or shorten in adaptation to the weight of the wheel W in response to a signal from a limit switch (not shown) which is mounted on the base plate 10 and which detects the placement. Thus, the air cylinder 16 holds the base plate 10 in a balanced state.

Numeral 17 indicates a retreat motion unit, which moves the truck 4 to a standby position in such a way that a pinion 17b meshing with a rack 17a mounted on the rail 3a is driven and rotated by a motor 17c fixed to the truck 4.

The wheel attachment aid apparatus of this embodiment constructed as stated above operates as follows:

At a wheel placement position at which the base plate 10 and the wheel supporting structure 12 are respectively indicated by dot-and-dash lines 10' and 12' in FIG. 2, the wheel W is placed on the wheel supporting structures 12, 12, and the distance between each pair of wheel carriers 12a, 12a is shortened by the corresponding air cylinder 12b so as to set the wheel W in a sandwiched manner. The limit switch (not shown) is actuated by the setting of the wheel W to feed the air cylinder 16 with air. Then, the air cylinder 16 is adjusted to extend or contract in adaptation to the weight of the wheel W, to bring the vertical motion unit 9 into a balanced state.

Subsequently, when the car body 1 conveyed along the assembly line has reached a predetermined position near the wheel attachment aid apparatus, the ingress thereof is acknowledged by a limit switch (not shown). The protrusive piece 5a of the synchronous motion unit 5 is protruded by the unshown air cylinder in response to a signal from the limit switch until it is brought into abutting engagement with the hanger 2 conveyed along the assembly line.

Then, the tractive force of the hanger 2 is transmitted to the truck 4 through the synchronous motion unit 5, and the truck 4 starts conveyance synchronous to the car body 1 conveyed along the assembly line, while being guided by the rail 3a through the guide rollers 3b, 3b, . . .

At the same time that the truck 4 starts the conveyance synchronized with the car body 1 hung by the hanger 2, the bed 50 is moved along the rails 4a, 4a constituting the truck 4 by an air cylinder (not shown), whereby the wheel W set on the wheel supporting structures 12, 12 is approximated to the hub 1a of the car body 1.

At the next step, the operator grasps the annular handle 15 and moves the pole 8, accordingly the wheel W, in the direction parallel to the assembly line and in the direction orthogonal to the same, that is, in the directions of coming near to and away from the car body 1, by means of the air cylinders 6c and 7c. Besides, he/she turns the handle 15 to turn the wheel W so that the mounting holes (not shown) of the wheel W may agree with hub bolts 1b, 1b, . . . jutting out of the hub 1a. In this state, the hub bolts 1b, 1b, . . . are snugly fitted into the mounting holes of the wheel W, and the wheel W is tentatively locked to the hub bolts 1b, 1b, . . . with nuts (not shown) through the opening 10b of the base plate 10.

By the way, in attaching the wheel W, the base plate 10 is held balanced by the angle adjusting device constructed of the cylinder 11 so as to be easily rockable about the turning pin 9c, so that the operation of positioning between the hub bolts 1b, 1b, . . . and the mounting holes of the wheel W can be performed with ease.

After the completion of the attachment of the wheel W, the bed 50 is moved back along the rails 4a, 4a and brought away from the car body 1, etc. on the basis of the control signal of a control switch (not shown). Further, the protrusive piece 5a of the synchronous motion unit 5 is retracted to release its engagement with the hanger 2. Then, the synchronous conveyance between the car body 1 and the truck 4 is ended.

Subsequently, the motor 17c of the retreat motion unit 17 is driven and rotated to retreat the truck 4 and restore it to its original position by means of the rack 17a as well as the pinion 17b. The truck 4 is caused to stand by at the position until the next car body 1 is conveyed to the predetermined ingress position. By repeating such operations, wheels are successively attached to car bodies which are conveyed along the assembly line in sequence.

According to the wheel attachment aid apparatus of the present invention described above, a wheel is set on wheel supporting structures at a wheel placement position, a base plate is held in a balanced state by an air cylinder which is spanningly interposed between a pole and a vertical motion unit, the base plate supporting the wheel is approximated to the wheel attachment position of a car body while being synchronously moved by a synchronous motion unit, and the wheel is moved horizontally and vertically and is rotated by turning a handle with the balanced state kept by the air cylinder, thereby to perform the positioning between the wheel and a hub mounted on the car body. An operator can therefore carry out a wheel attaching job without directly lifting up the wheel, so that the burden of the wheel attaching job on the operator can be sharply relieved, and enhancement in the efficiency of the job can be expected. Further, any nut runner is not disposed, and any accessory device such as a wheel positioning device for positioning the wheel at the step of setting this wheel need not be disposed, so that the whole apparatus is reduced in size and simplified in construction, and the occupation space thereof for installation becomes smaller. Moreover, the apparatus can attain curtailment in the cost of equipment, and it can be easily installed even for an existing assembly line.

What is claimed is:

1. A wheel attachment aid apparatus in an automobile assembly line, comprising:

a hanger by which a car body is hung and conveyed along said assembly line;
a truck which is disposed so as to be movable along said assembly line sideward of said assembly line;
a synchronous motion unit which is mounted on said truck and which moves said truck in engagement with said hanger and in synchronism with the conveyed car body;
a bed which is mounted on a lower surface of said truck so as to be horizontally movable in a direction intersecting said assembly line;
a pole which is suspended from said bed;
a vertical motion unit which is mounted so as to be vertically movable along said pole;
a flat base plate which is suspended by said vertical motion unit and which has an opening in its central part, an annular sprocket which is supported on said base plate so as to be turnable along an outer periphery of said opening;
a pair of wheel supporting structures which are respectively disposed at front and rear ends of said base plate on a lower side thereof so as to project toward said assembly line and to be turnable about horizontal rotational aces and each of said wheel supporting structures has sprocket mounted thereon;
a handle which is mounted on said annular sprocket and which drives and rotates said annular sprocket and the sprockets of said wheel supporting structures and which drives and rotates said wheel supporting structures through manipulation of said handle; and
an air cylinder which is spanningly interposed between said pole and said vertical motion unit and which has a function as a balancing actuator for folding said base plate in a balanced state in correspondence with a weight of a wheel placed on said wheel supporting structures.

2. The wheel attachment aid apparatus in an automobile assembly line as defined in claim 1, wherein said each wheel supporting structure includes a pair of wheel carriers which hold both sides of an outer periphery of the wheel therebetween.

3. The wheel attachment aid apparatus in an automobile assembly line as defined in claim 2, wherein said each wheel supporting structure includes a cylinder by which said pair of wheel carriers can be moved in directions of coming near to and away from each other.

4. The wheel attachment aid apparatus in an automobile assembly line as defined in claim 1, wherein said pole suspended from said bed can be moved in a direction orthogonal to said assembly line and in a direction parallel to said assembly line.

5. The wheel attachment aid apparatus in an automobile assembly line as defined in claim 1, further comprising an angle adjusting device by which said base plate suspended from said vertical motion unit is held in the balanced state.

* * * * *